United States Patent
Premkumar et al.

(10) Patent No.: US 9,038,017 B2
(45) Date of Patent: May 19, 2015

(54) METHOD AND SYSTEM FOR FACILITATING RAPID DEVELOPMENT OF END-TO-END SOFTWARE APPLICATIONS

(71) Applicant: Cognizant Technology Solutions India Pvt. Ltd., Chennai (IN)

(72) Inventors: Prashanth Premkumar, Velachery (IN); Manigandan Kannan, Kottivakkam (IN); Lakshmi Narasimhan Venkatakrishnan, Chennai (IN); Antony Sudharshan Gnanaraj, Chennai (IN); Vasu Rangachary, Chennai (IN)

(73) Assignee: Cognizant Technology Solutions India Pvt. Ltd. (IN)

( * ) Notice: Subject to any disclaimer, the term of this patent is extended or adjusted under 35 U.S.C. 154(b) by 193 days.

(21) Appl. No.: 13/687,202

(22) Filed: Nov. 28, 2012

(65) Prior Publication Data

US 2014/0059517 A1    Feb. 27, 2014

(30) Foreign Application Priority Data

Aug. 23, 2012  (IN) .......................... 3469/CHE/2012

(51) Int. Cl.
*G06F 9/44*    (2006.01)
(52) U.S. Cl.
CPC .. *G06F 8/24* (2013.01); *G06F 8/34* (2013.01); *G06F 8/35* (2013.01)
(58) Field of Classification Search
None
See application file for complete search history.

(56) References Cited

U.S. PATENT DOCUMENTS

| | | | |
|---|---|---|---|
| 5,966,532 A | 10/1999 | McDonald et al. | |
| 7,110,936 B2 | 9/2006 | Hiew et al. | |
| 7,389,492 B2 | 6/2008 | Chupa et al. | |
| 7,761,848 B1 | 7/2010 | Chaffin | |
| 7,913,224 B2 | 3/2011 | Nissen et al. | |
| 7,921,408 B2 * | 4/2011 | Shenfield et al. | 717/107 |
| 8,069,437 B2 * | 11/2011 | Aigner et al. | 717/109 |
| 8,099,725 B2 | 1/2012 | Jin et al. | |
| 2003/0056195 A1 | 3/2003 | Hunt | |

* cited by examiner

*Primary Examiner* — Don Wong
*Assistant Examiner* — Deric Ortiz
(74) *Attorney, Agent, or Firm* — Lerner, David, Littenberg, Krumholz & Mentlik, LLP (57) ABSTRACT

A method and system for rapidly generating software applications is provided. An application model of a software application is generated which comprises modeled components and technology stack information. The modeled components correspond to functional and design aspects of the software application. The application model is generated by dragging and dropping multiple components into corresponding modeling perspectives defined in a visual modeling environment. Descriptors are generated for the application model which are logical representations describing each of the modeled components. Further, the descriptors are generated from application model object of the application model. Furthermore, technology templates are identified based on the technology stack information in the application model. The technology templates are predetermined templates comprising scripting languages for automatically transforming the application model into one or more technologies. Code related to the software application is generated based on the descriptors and the identified technology templates.

18 Claims, 3 Drawing Sheets

METHOD AND SYSTEM FOR FACILITATING RAPID DEVELOPMENT OF END-TO-END SOFTWARE APPLICATIONS

FIELD OF THE INVENTION

The present invention relates generally to the field of software application development and more specifically to a method and system for developing end-to-end software applications independent of any specific platform via visual modeling and automatic generation of code related to the software applications.

BACKGROUND OF THE INVENTION

With advancements in network technologies, various industries such as retail, finance, e-commerce etc. provide software applications to consumers for viewing and accessing products or services online. The software applications may include, but are not limited to, web applications, mobile applications, client-server applications, business services etc. Software applications are computer applications which are developed by software developers based on functional and design requirements of the various industries. Using network technologies such as the internet, consumers access the software applications for carrying out various transactions.

Developing software applications manually is a complex and time consuming process as software application codes has to be written and rewritten, more so, for multiple technologies that have differing programming styles, development procedures and standards. Due to such differences, software development typically faces skill set challenges, technology challenges and technology asset standardization challenges. Lack of standardization of technology assets further leads to lack of share and reuse of technology artifacts. In addition, evolving technologies, differing software development methodologies, disparate tools and distributed teams of software developers add to complexity in developing software applications. Also, inconsistencies in code generation methods by different software developers result in implementation inconsistencies of software applications. Furthermore, revamping wizards and various user interface features of the software applications to reflect changes caused by evolving use of products and services is a tedious and time consuming task. In addition, software application development is a complex process and a lot of learning is involved to quickly build and deploy software applications for use. Moreover, developing software applications using integrated development environments provided in desktops cause installation, upgradation and accessibility issues to software developers.

In light of the abovementioned disadvantages, there is a need for a method and system for rapidly developing end-to-end software applications without requiring to manually write and rewrite code. Further, there is a need for a method and system for providing an online platform for users to develop software applications in multiple technologies and easy integration of various functionalities/transactions of the software applications. In addition, there is a need for a method and system for developing software applications without requiring knowledge of complex programming details.

SUMMARY OF THE INVENTION

A computer-implemented method for rapidly generating software applications is provided. The computer-implemented method comprises generating, via a processor, an application model of a software application. The application model comprises modeled components and technology stack information. The modeled components correspond to functional and design aspects of the software application. The application model is generated by dragging and dropping multiple components into corresponding modeling perspectives defined in a visual modeling environment. The computer-implemented method further comprises generating, via the processor, descriptors for the application model. The descriptors are logical representations describing each of the modeled components. Further, the descriptors are generated from application model object of the application model. Furthermore, the computer-implemented method comprises identifying, via the processor, one or more technology templates based on the technology stack information in the application model. The one or more technology templates are predetermined templates comprising one or more scripting languages for automatically transforming the application model into one or more technologies. The computer-implemented method further comprises generating, via the processor, code related to the software application based on the descriptors and the identified one or more technology templates.

A system for rapidly generating software applications is provided. The system comprises an application model generator in communication with a processor and configured to generate an application model of a software application. The application model comprises modeled components and technology stack information. The modeled components correspond to functional and design aspects of the software applications. The application model is generated by dragging and dropping multiple components into corresponding modeling perspectives defined in a visual modeling environment. Further, the system comprises an application descriptor module in communication with the processor and configured to generate descriptors for the application model. The descriptors are logical representations describing each of the modeled components and further wherein the descriptors are generated from application model object of the application model. Furthermore, the system comprises a template module in communication with the processor and configured to identify one or more technology templates based on the technology stack information in the application model. The technology templates are predetermined templates including one or more scripting languages for automatically transforming the application model into one or more technologies. The system further comprises an application code generator engine in communication with the processor and configured to generate code related to the software application based on the descriptors and the identified one or more technology templates.

A computer program product comprising a non-transitory computer-readable medium having computer-readable program code stored thereon. The computer-readable program code comprises instructions that, when executed by a processor, cause the processor to generate an application model of a software application. The application model comprises modeled components and technology stack information. The modeled components correspond to functional and design aspects of the software application. The application model is generated by dragging and dropping multiple components into corresponding modeling perspectives defined in a visual modeling environment. The computer-readable program code further comprises instructions that, when executed by the processor, cause the processor to generate descriptors for the application model. The descriptors are logical representations describing each of the modeled components. Further, the descriptors are generated from application model object of the application model. The computer-readable program code further comprises instructions that, when executed by the processor, cause the processor to identify one or more technology templates based on the technology stack information in the application model. The technology templates are predetermined templates including one or more scripting languages for automatically transforming the application model into one or more technologies. Further, the computer-readable program code comprises instructions that, when executed by the processor, cause the processor to generate code related to the software application based on the descriptors and the identified one or more technology templates.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system, method and computer-program product is provided for rapidly developing end-to-end software applications. The invention provides for capturing various software system details related to the software applications in the form of abstract models via visual modeling. Further, the invention provides for translating the abstract models into any technology using predetermined standardized technology templates. The invention further provides for generating any technology code using the abstract models and relevant technology templates.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
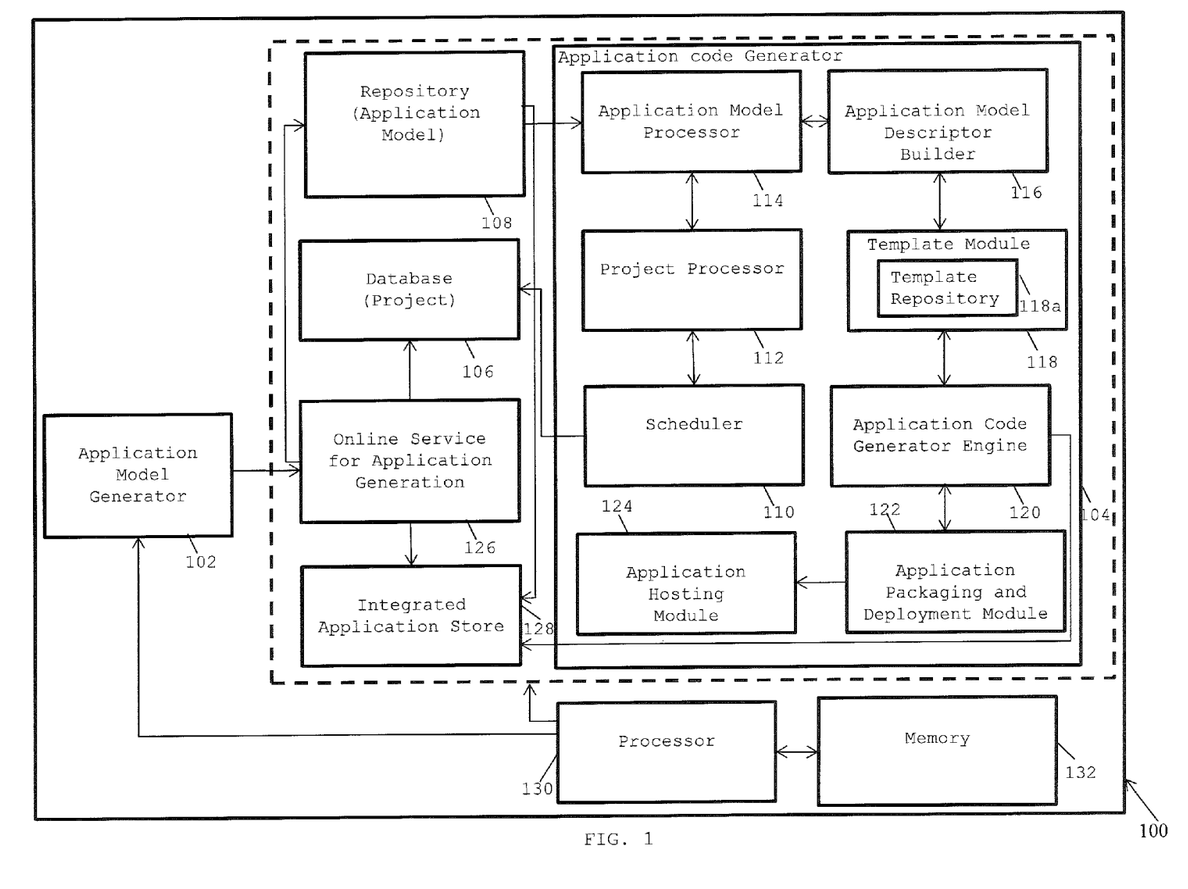
FIG. 1 is a block diagram of a system for facilitating rapid development of end-to-end software applications, in accordance with an embodiment of the present invention.

FIG. 1 is a block diagram of a system 100 for facilitating rapid development of end-to-end software applications, in accordance with various embodiments of the present invention. The system 100 is deployed on a web server (not shown) and provides a user interface to users (i.e. software developers) for rapid development of software applications. In an exemplary embodiment of the present invention, the web server includes Apache Tomcat server.

In an embodiment of the present invention, the system 100 acts as platform-as-a-service (PaaS) which facilitates the users to develop end-to-end software applications online. The software applications may include, but are not limited to, web applications, mobile applications, client-server applications, business services etc. pertaining to various industries including, but not limited to, retail, health care, banking, e-commerce, travel, insurance and car rental applications. In an exemplary embodiment of the present invention, the user accesses the system 100 on a Rich Internet Application (RIA) framework such as Flex via a web browser (not shown). The user credentials are authenticated using Lightweight Directory Access Protocol (LDAP) authentication services or any authentication data store, which allows the user to access the system 100. In another embodiment of the present invention, the system 100 can be implemented in a cloud computing environment and offered to users as a cloud-based service.

In various embodiments of the present invention, the system 100 comprises an application model generator 102, an application code generator 104, a database 106, a repository 108 and an integrated application store 128. In an exemplary embodiment of the present invention, the application model generator 102 communicates with the database 106, the repository 108 and the application code generator 104 via an online service for application generation 126. The application model generator 102, the application code generator 104, the database 106 and the repository 108 operate in communication with a processor 130 and a memory 132.

The application model generator 102 is a client-server architecture which provides an integrated development environment to facilitate the user to generate application models for one or more software applications which the user intends to develop. In an embodiment of the present invention, various network layers facilitate in the overall functioning of the application model generator 102. The various network layers include client layer, application layer, integration layer, and data layer which facilitates the user to interface with the application model generator 102 and carry out various functionalities associated with the application model generator 102 such as presentation, processing, communication with databases and storage.

For generating the application models, the application model generator 102 has modeling perspectives which are defined to capture various functional and design aspects of the software application and related software system details which need to be built. As will be understood by a person skilled in the art, the software system details would include computer programs, system usecases, user interface, program control flow, database interactions, configuration files, cross-cutting concerns, requirement specification, test results, system documentation describing the structure of system, and end-user documentation describing method of use of the system and other meta-data related to the software application.

In an embodiment of the present invention, the modeling perspectives include, but are not limited to, business perspective or use case perspective, architect perspective or web case perspective, design perspective, user interface perspective, data perspective, programmer perspective and stack perspective. Further, the one or more modeling perspectives employ various components which are used to model software applications. The various components include, but are not limited to, one or more functional modules, use cases, system transactions, technology components, working screen components (i.e. input screen components and output screen components), program control flow and database components. Each component is associated with unique predetermined attributes including, but not limited to, name, identification, input parameters, output parameters etc.

In an embodiment of the present invention, the application model generator 102 provides the one or more modeling perspectives to the user in a visual modeling environment of the integrated development environment via a web interface. The visual modeling environment includes a work area, and a toolset. In various embodiments of the present invention, to create the application model, the user drags various components from the toolset and drops the components to the relevant one or more modeling perspectives in the work area. The work area is the design area where the modeling takes place. When the components are dragged and dropped in the work area, the user can make changes to the predetermined attributes as per system requirements of the software application which the user wishes to develop. Accordingly, the modeling perspectives facilitate the user to model end-to-end software applications. The end-to-end software applications typically encompass various functional flows, transactional flows, working screen, database operations and application logic which are modeled using the modeling perspectives [This will be explained in detail in below mentioned paragraphs of the specification]. In an exemplary embodiment of the present invention, each modeling perspective is established using meta-data defined in an Extensible Mark Up Language (XML) framework. In an embodiment of the present invention, the XML framework includes a predetermined XML schema for capturing various functional and design data aspects related to one or more software applications of different technologies, platforms or industries. In another embodiment of the present invention, the XML framework is an extensible framework which provides the ability to add new components and modeling features to cater to new modeling requirements. In yet another embodiment of the present invention, the predetermined XML schema is configured to record application modeling information. [The application modeling is described in below mentioned paragraphs]

In an exemplary embodiment of the present invention, the business perspective or usecase perspective facilitates to model the functional flow of the software application by dragging and dropping various components from the toolset to the work area. The components such as one or more functional modules and one or more use cases are defined in the business perspective. Functional modules contain information related to data objects, use cases, and transactions associated with a particular module, which are defined by performing requirement analyses of the software system related to the software application. Use case is an ordered sequence of basic functional units of the software application which are defined based on the functional modules. In particular, the business perspective provides a "project view" in the user interface of the application model generator 102. The "project view" facilitates the user to instantiate a project to develop the software application. During the modeling process, the user drags and drops the functional modules from the toolset to the work area. Further, the user drags and drops the use cases from the toolset to the work area. The user then links the use cases as per a predefined logical flow of the project. For example, the project is an "e-shopping application". The functional modules of the "e-shopping application" may include "shopping module", "payment module", etc. The use cases may include shopping cart use case", "product search use case", "payment use case" etc. The "shopping cart use case" is then linked to "product search use case" and "payment use case". Accordingly, the functional flow of the software application is modeled.

In another exemplary embodiment of the present invention, the architect perspective or web case perspective facilitates to define transactions of the use cases which are defined in the use case perspective and model the transactional flow of the use cases. In particular, the architect or web case perspective provides a "web case" view in the user interface of the application model generator 102. The "web case view" provides specialized web case components i.e. the system transaction components. Examples of the specialized web case components include, but are not limited to, functional web cases, inquiry web case, product search web case, report web case, schedule web case, and Asynchronous JavaScript and XML (Ajax) service web case. The specialized web case components may be developed in the application model generator 102 using specialized technology service components services such as web services which are assembled and wired to develop the web case components. During the modeling process, end-to-end transactions are designed for each use case by dragging and dropping the specialized web case components from the toolset to the work area in the architect or web case perspective. The user then links the specialized web case components in terms of a predefined transactional flow to model the system transactions. In one example, for modeling the system transactions in the e-shopping application, various transactions that need to be modeled in case of a "product search use case" may include searching a product, rendering product search results on a screen, throwing errors on the screen etc. In another example, various transactions that need to be modeled in case of a "shopping cart use case" may include selecting a product, adding product to shopping cart and updating product in the shopping cart.

In another exemplary embodiment of the present invention, the design perspective facilitates to design technology components that constitute the system transactions or web cases defined in the architect or web case perspective. Examples of the technology components include, but are not limited to, screens, controllers, business services, data services, façade components etc. Further, this perspective facilitates to define domain objects for modeling real world entities of the software application such as customer related information, product related information etc. The domain objects are defined by identifying various attributes for the domain objects and associated validations for each of the attributes. In an embodiment of the present invention, the design perspective facilitates to interface with existing components, existing applications/systems and Commercial Off-the-shelf (COTS) products. In an exemplary embodiment of the present invention, custom adapters are provided in the design perspective which can be used to integrate with any custom component. In addition, the design perspective includes custom tool adapters such as rules engine adapter, Business Process Management (BPM) adapter etc. which can be used to model integration with Commercial Off-the-shelf (COTS) products.

In yet another embodiment of the present invention, the user interface perspective facilitates to model the working screen of the software application by dragging and dropping various components from the toolset to the work area. The user interface perspective provides the "user interface" view which contains various components such as input screen components, output screen components and various other user interface components. In addition, the toolset includes a variety of rich user interface components to design rich, interactive screens. In an exemplary embodiment of the present invention, for the "product search web case", "product search screen", "product search service screen", "product search controller screen", "product search result screen" and "product error screen" is designed by dragging and dropping various input and output screen components from the toolset to the work area. Further, the screen layout is also designed by dragging and dropping user interface components such as "header", "footer", "text box", "labels" and rich user interface components such as tables, grids, tree components etc. from the toolset to the work area.

In another embodiment of the present invention, the data perspective facilitates to model database operations related to the software application which the user wishes to develop. In an exemplary embodiment of the present invention, functional Standard Query Language (SQL) queries are prepared by the user in this perspective for modeling database transactions of the software application. Further, this perspective also facilitates mapping input data and corresponding output data for carrying out database operations. In addition, the data perspective allows users to model object relational mapping for object-relational mapping (ORM) type data operations and Not only SQL (NOSQL) type data operations. NOSQL is a type of database operation supported by databases such as MongoDB which does not require queries to access data. Such databases require simple object operations to access data.

In another embodiment of the present invention, the programming perspective facilitates modeling application logic of the software application. Program control statements such as "if", "while", "for" etc. are dragged from the toolset and dropped in the work area to create the application logic. Each of the program control statements has an expression to build application logic related to the software application. Further, this perspective also facilitates the user to ensure that exception handling, program control flow, expressions, business rules and logging are taken care of.

In another embodiment of the present invention, the stack perspective facilitates designing technological implementation for each use case defined in the use case perspective based on stack information (herein also referred as "technology stack information"). For example, the stack information includes, but is not limited to, JAVA and .Net technology stack. This perspective facilitates the user to select a technology stack. Furthermore, this perspective facilitates to select frameworks within a technology (e.g. struts or spring) and technology implementation for each component (e.g. JQGrid for a user interface table or display tag for a user interface table).

In yet another exemplary embodiment of the present invention, the one or more modeling perspectives facilitate various quality settings and project configuration settings for the software application. The quality settings include, but are not limited to, quality parameters, unit testcase data capture, and quality reports. The project configuration settings include, but are not limited, to LDAP credentials, uploaded file types, Simple Mail Transfer Protocol (SMTP), connection strings related to user, server, database parameters etc. related to the software application.

As discussed above, using the above modeling perspectives, application model corresponding to the software application is generated. In an embodiment of the present invention, the application model is a graphical representation of project, modules, use case, web case and various transactions related to the software application. The application model is generated as an XML file. The application model XML file contains various files such as Project XML file, CommonModule XML file, ModuleN XML files (i.e. one file per module), Settings XML file, Layouts XML file and Stack XML file. The Project XML file contains project name, project identification etc. of a project instantiated corresponding to the software application. The CommonModule XML file contains data such as data objects, shared use cases etc., and can be shared across users using the same project. The ModuleN XML files are n number of module XML files which contain data such as data object, use case and transactions related to each of the modules and user interface information. The data of each module may have reference to the common module. The Settings XML contain properties such as lightweight directory access protocol (LDAP), database properties, SMTP, uploaded files, webservices etc. The Settings XML is shared across the users. The Layout XML contains different user interface layouts of a project. The Stack XML contains the technology stack details for the modeled application. In particular, the Stack XML applies to modeled project corresponding to the software application and can be changed to generate the software application in a new technology. The application model generator 102 executes the abovementioned functionalities via the processor 130 using program instructions stored in the memory 132.

In an embodiment of the present invention, one or more projects can be instantiated corresponding to one or more software applications which are to be developed in the application model generator 102 (in the manner discussed previously). In an embodiment of the present invention, the instantiated projects are stored in the database 106 via the online service for application generation 126. In an exemplary embodiment of the present invention, the database 106 is a relational database management system such as MYSQL, Oracle or SQLServer. In another embodiment of the present invention, the instantiated projects are stored in a file repository. Further, the application model XMLs generated at the application model generator 102 corresponding to each of the instantiated projects are stored in the repository 108 via the online service for application generation 126. In an embodiment of the present invention, the repository 108 is user specific. In another embodiment of the present invention, the repository 108 is project specific.

The application code generator 104 is a module configured to generate code related to the software applications using corresponding application model XMLs and relevant technology templates. The technology templates contain relevant scripting language which provides the capability to transform the application model into any specific technology selected by the user during the modeling process. (The code generation process using application model XMLs and technology templates will be described in the below mentioned paragraphs).

The application code generator 104 further comprises one or more modules such as a scheduler 110, a project processor 112, an application model processor 114, an application module descriptor builder 116, a template module 118, an application code generator engine 120, an application packaging and deployment module 122 and an application hosting module 124. The abovementioned modules are part of various network layers which facilitate in the overall functioning of the application code generator 104. The various network layers include client layer, application layer, integration layer, and data layer which facilitates the user to interface with the application code generator 104 and carry out various functionalities associated with the application code generator 104 such as presentation, processing, communication with databases and storage. The application model generator 102 executes various functionalities via the processor 130 using program instructions stored in the memory 132.

In an embodiment of the present invention, the scheduler 110 is a module configured to monitor the database 106 and obtain a list of projects which are modeled and are ready for code generation. The scheduler 110 obtains the project list stored in the database 106 at predetermined periodic intervals of time. Based on the project list obtained from the scheduler 110, the project processor 112 is configured to retrieve the projects from the database 106 for processing the projects. The project processor 112 is further configured to process the projects one by one and obtains information related to the projects. The project related information includes information related to corresponding application model XML of each of the projects and location of the application model XML in the repository 108. The project processor 112 then assigns a priority level to the projects for further processing. Based on the priority level, the application model processor 114 is configured to obtain the application model XML corresponding to the project with the highest priority level from the repository 108. The application model processor 114 then parses the application model XML to convert the application model into application model object. In an exemplary embodiment of the present invention, the application model XML can be parsed using JAXB parser to obtain Java Object representation of the XML.

In an embodiment of the present invention, the application model descriptor builder 116 is configured to convert the application model object into technology component specific descriptors which describe the modeled components. In particular, the descriptors are logical representations (including the meta data) for the modeled components and is populated using the elements, attributes, and mappings defined in the application model object. The descriptors have one to one mapping with the modeled components in the application model object. In particular, each of the modeled components in the application model object is converted into a logical representation which describes the modeled components. In an exemplary embodiment of the present invention, XML Java objects are converted into technology Java descriptors using predetermined descriptor builders such as user interface builders, controller builders, data service builders, business service builders etc.

In an embodiment of the present invention, the template module 118 is configured to identify relevant one or more technology templates based on stack information in the application model. The stack information is in the form of Stack XML, which provides technology information related to each modeled component. The template module 118 accesses and retrieves the identified technology templates from a template repository 118a. The template repository 118a stores one or more technology templates which facilitate to translate the application model into any specific technology. As discussed previously, the specific technology includes, but is not limited to, Java, .Net, iphone OS (IOS), HTML5 based mobile technology templates, and android based mobile technology templates.

In an exemplary embodiment of the present invention, each technology template is assigned an identification and name corresponding to each modeled component. The technology templates are identified and retrieved based on the technology identification and name assigned to each technology template. The technology templates contain relevant scripting language which provides the capability to transform the application model into any specific technology. In an exemplary embodiment of the present invention, the technology templates contain velocity template language scriptlets which facilitate to incorporate dynamic content of the application model and translate the application model into any specific technology. In another embodiment of the present invention, technology templates corresponding to new technologies can be provided in template repository 118a, and the application model can be transformed into new technologies using the templates.

The template module 118 is further configured to retrieve the descriptors from the application descriptor builder module 116 and pass the identified technology template and the descriptors to the application code generator 120. The application code generator engine 120 is configured to generate meaningful blocks of code related to the software application using a code generator routine. The code generator routine takes the technology template and the descriptors from the template module 118 as inputs and produces the code related to the software application. In an exemplary embodiment of the present invention, the code may be generated as chunks of files of relevant technology (e.g. Java, .Net etc.). The generated code of the software application follows open standards and resembles human written code. Further the code can be converted from one technology stack to another. In an embodiment of the present invention, the application packaging and deployment module 122 is configured to compile, package and deploy the developed software application in real time. Further, the application hosting module 124 is configured to host the developed software application and provides the user a working version of the developed software application. In another embodiment of the present invention, the application models and application codes which are generated for software applications are stored in the integrated application store 128 to facilitate reuse.

In various embodiments of the present invention, the users can access the developed software applications using various online interfaces. Further, the software applications can be modeled and developed by various users located at different geographic locations collaboratively and can contribute to the overall development of the software applications seamlessly. In addition, various codes and modules generated by various users can be integrated using the online interface. The users can model the software application, make changes, re-generate the application model and view the changes in real-time. Once the application is developed or partially developed, the users can access the generated software application instantly using an application Uniform Resource Locator (URL). The developed software application provides an integrated flow of various functionalities and transactions. Since the generated application models and application codes are platform and technology independent, they can be used by a wide array of users developing different software applications for different industries.

Figure 2:
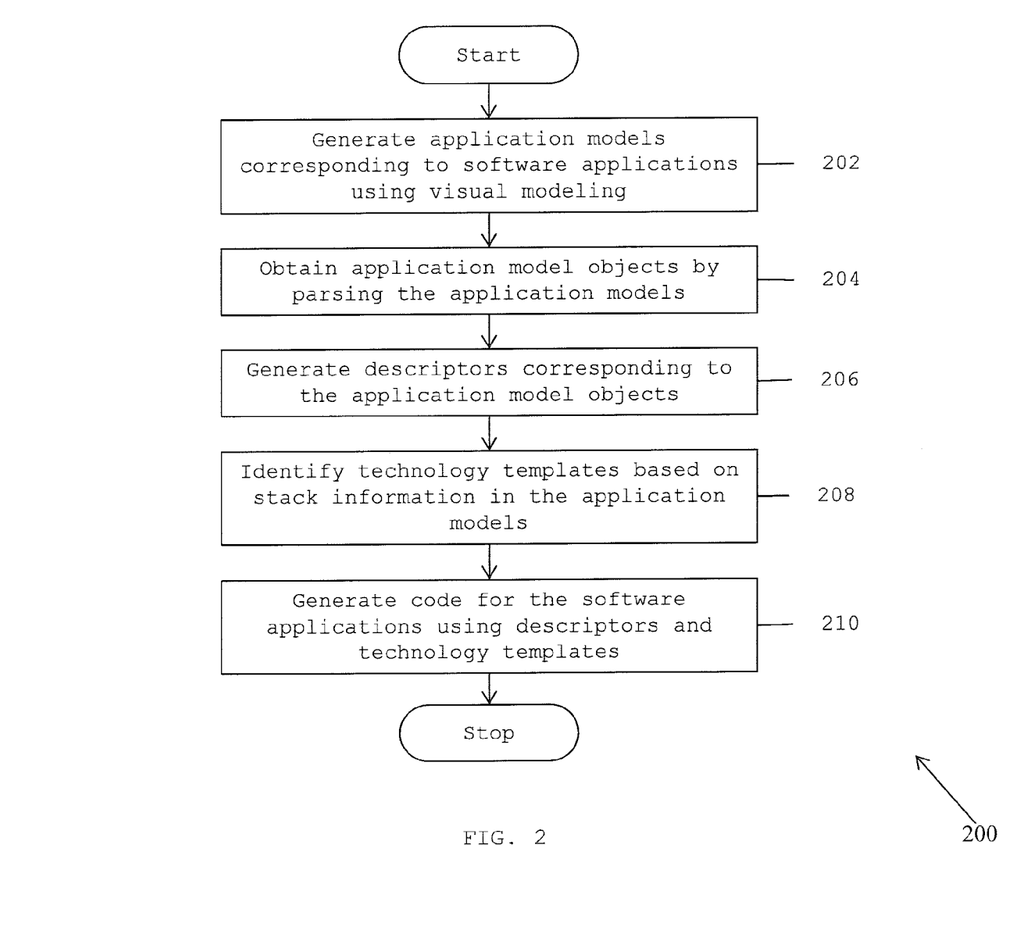
FIG. 2 is a flowchart of a method for facilitating rapid development of end-to-end software applications, in accordance with an embodiment of the present invention.

FIG. 2 is a flowchart of a method for facilitating rapid development of end-to-end software application, in accordance with an embodiment of the present invention.

At step 202, one or more application models corresponding to one or more software applications are generated using visual modeling. In an embodiment of the present invention, one or more projects are instantiated corresponding to one or more software applications. Application models are generated for the instantiated one or more projects using visual modeling. In an exemplary embodiment of the present invention, the application model is generated using modeling perspectives including, but are limited to, business perspective, architect perspective, design perspective, user interface perspective, data perspective, programmer perspective, stack perspective. The modeling perspectives facilitate the user to model end-to-end software applications. The end-to-end software applications typically encompasses various functional flows, transactional flows, working screen, database operations and application logic which are modeled using the modeling perspectives. In an exemplary embodiment of the present invention, each modeling perspective is established using meta-data defined in an XML framework. [The application model generation is described in conjunction with FIG. 1]. The application models are generated as an application model XML file. The application model XML file includes, but not limited to, Project files, various Module files, Layout files, Settings files, and Stack files. The Stack files contain information related to one or more technologies including, but not limited to, Java, .Net, IOS, HTML5 and mobile technology selected by the user during the modeling process.

At step 204, the one or more application models are parsed to obtain corresponding application model objects. In an embodiment of the present invention, the one or more projects which are modeled and are ready for code generation are retrieved from a database. The one or more projects are processed one by one and corresponding application model XML files stored in a repository are identified. The application model XML files are then parsed using known methods to obtain the application model objects. The application model objects are object representation of the application model XML files. In an exemplary embodiment of the present invention, the application model objects are Java Objects.

At step 206, descriptors are obtained corresponding to the application model objects. In an embodiment of the present invention, the descriptors are logical representations which describe the application model objects. In particular, the descriptors describe the application model objects by conforming to the elements, attributes, and mappings defined in the application model object.

At step 208, relevant one or more technology templates are identified based on the stack information in the application model. In an embodiment of the present invention, the technology templates contain relevant scripting language which provides the capability to transform the application model into any specific technology selected by the user during the modeling process. The selected technology is identified based on the stack information contained in the stack files of the application model.

At step 210, code related to one or more software applications is generated using the technology template and descriptors. In an embodiment of the present invention, a code generator routine takes the technology templates and the descriptors as inputs and produces the code related to the software application. In an exemplary embodiment of the present invention, the code may be generated as chunks of files of relevant technology (e.g. Java, .Net etc.). In an embodiment of the present invention, once all the files of the code are generated, the files are merged using a packager. The merged files are then formatted via a formatter into various single or multiple blocks of code. This aids in logical grouping and searching of the code files based on user requirement. The users can access the software application using application Uniform Resource Locators (URLs) corresponding to the software applications.

In an exemplary embodiment of the present invention, for modeling a database operation such as a Standard Query Language (SQL) query for a web application, a web interface is provided in the data modeling perspective which allows the user to select various field names corresponding to rows and columns of required tables. Once the query is modeled, an XML file is generated for the query. The XML file is automatically transformed into objects having various XML data components. Descriptors are then generated to logically describe each of the XML data components. Using the descriptors and a predefined J2EE-DB technology template, Java code is automatically generated for the SQL query. Additionally or alternately, using the descriptors and another predefined .Net-DB technology template, .Net code is automatically generated for the SQL query. Further, Java code generated for the SQL query can be automatically transformed to .Net code using the .Net-DB technology template. Similarly, advanced data operations such as object relational mapping (ORM) and Not only SQL (NOSQL) database operations can be modeled and translated into any technology code. Advantageously, code generation in accordance with various embodiments of the present invention is not tied to any particular technology/platform. Rather, code can be generated for multiple technologies/platforms rapidly without the need to manually write or rewrite different technology codes.

Figure 3:
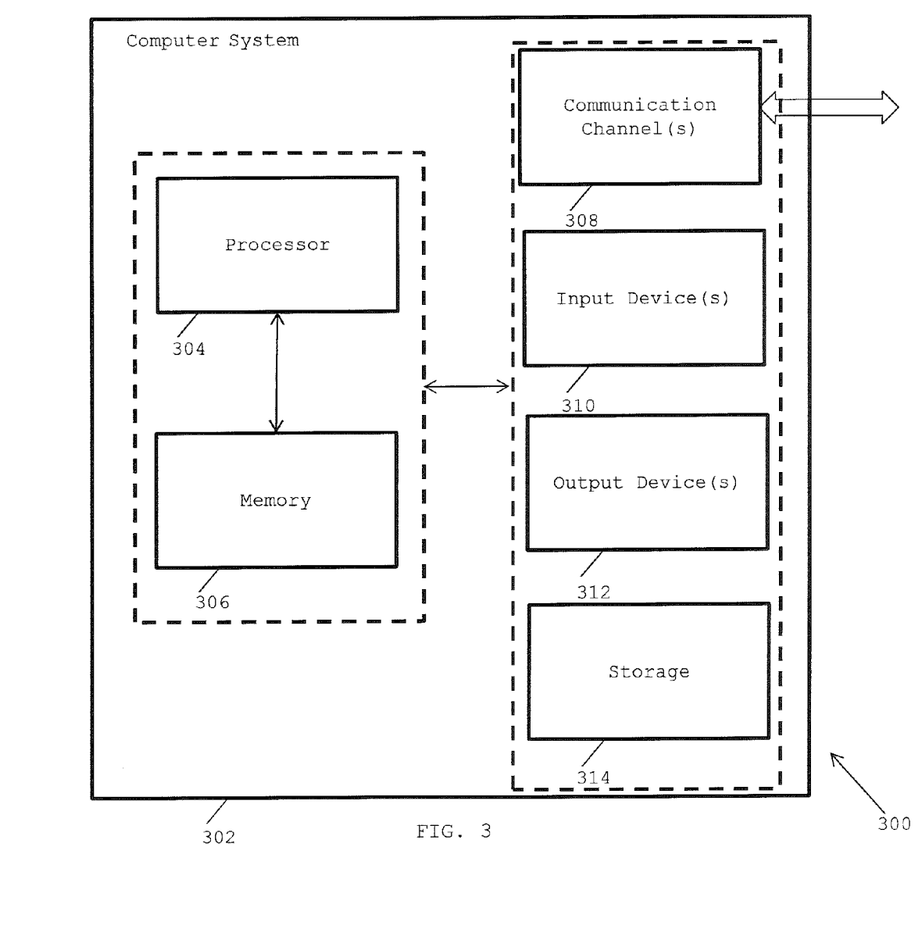
FIG. 3 illustrates an exemplary computer system in which various embodiments of the present invention may be implemented.

FIG. 3 illustrates an exemplary computer system in which various embodiments of the present invention may be implemented.

The computer system 302 comprises a processor 304 and a memory 306. The processor 304 executes program instructions and may be a real processor. The processor 304 may also be a virtual processor. The computer system 302 is not intended to suggest any limitation as to scope of use or functionality of described embodiments. For example, the computer system 302 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

In an embodiment of the present invention, the computer system 302 is part of a distributed network where various embodiments of the present invention are implemented for rapidly developing end-to-end software applications.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A computer-implemented method for rapidly generating executable software applications, the computer-implemented method comprising:
    generating, via a processor, an application model of a software application, the application model comprises modeled components and technology stack information, the modeled components correspond to functional and design aspects of the software application, the application model being generated by dragging and dropping multiple components into corresponding modeling perspectives defined in a visual modeling environment, wherein the modeling perspectives provide:
        one or more functional modules comprising information obtained based on requirement analysis of the software application, and one or more use cases that are capable of being linked to each other based on predefined logical flow of the one or more functional modules for modeling functional flow of the software application, and
        further wherein the modeling perspectives provide one or more components that are capable of being linked based on a predefined transactional flow to define transactions for each of the one or more use cases for modeling transactional flow of the software application;
    generating, via the processor, descriptors for the application model, the descriptors being logical representations describing each of the modeled components, wherein the descriptors are generated based on elements, attributes, and mappings defined in application model object of the application model;
    identifying, via the processor, one or more technology templates based on the technology stack information in the application model, wherein the one or more technology templates are predetermined templates comprising one or more scripting languages for automatically transforming the application model into one or more technologies;
    generating, via the processor, blocks of code related to the software application based on the descriptors and the identified one or more technology templates, wherein the blocks of code correspond to the technology defined in the technology stack information; and
    assembling, via the processor, the blocks of code to generate the software application based on logical formatting of the blocks of code.

2. The computer-implemented method of claim 1, wherein the modeling perspectives further provides business perspective, architect or web case perspective, design perspective, user interface perspective, data perspective, programmer perspective and stack perspective.

3. The computer-implemented method of claim 1, wherein the application model is represented as an application model XML file, wherein the application model XML file comprises Project XML file, CommonModule XML file, ModuleN XML file, Settings XML file, Layouts XML file and Stack XML file related to the software application.

4. The computer-implemented method of claim 1, wherein the multiple components comprise one or more functional modules, use case, system transaction components, working screen components, and database components.

5. The computer-implemented method of claim 1, wherein the technology templates comprise Java, .Net, iphone OS (IOS) and mobile technology templates.

6. The computer-implemented method of claim 1, wherein the blocks of code related to the software application is generated using a code generator routine based on the descriptors and the identified one or more technology templates.

7. A system for rapidly generating executable software applications, the system comprising:
    an application model generator in communication with a processor and configured to generate an application model of a software application, the application model comprises modeled components and technology stack information, the modeled components correspond to functional and design aspects of the software applications, the application model being generated by dragging and dropping multiple components into corresponding modeling perspectives defined in a visual modeling environment, wherein the modeling perspectives provide:
        one or more functional modules comprising information obtained based on requirement analysis of the software application, and one or more use cases that are capable of being linked to each other based on predefined logical flow of the one or more functional modules for modeling functional flow of the software application, and
        further wherein the modeling perspectives provide one or more components that are capable of being linked based on a predefined transactional flow to define transactions for each of the one or more use cases for modeling transactional flow of the software application;

an application descriptor module in communication with the processor and configured to generate descriptors for the application model, the descriptors being logical representations describing each of the modeled components, wherein the descriptors are generated based on elements, attributes, and mappings defined in application model object of the application model;

a template module in communication with the processor and configured to identify one or more technology templates based on the technology stack information in the application model, wherein the technology templates are predetermined templates including one or more scripting languages for automatically transforming the application model into one or more technologies; and an application code generator engine in communication with the processor and configured to generate blocks of code related to the software application based on the descriptors and the identified one or more technology templates, the blocks of code correspond to the technology defined in the technology stack information, wherein the blocks of code are assembled to generate the software application based on logical formatting of the blocks of code.

8. The system of claim 7 further comprising an application model processor in communication with the processor and configured to convert the application model into application model object.

9. The system of claim 1 further comprising a database for storing one or more projects related to one or more software applications which are created in the application model generator.

10. The system of claim 9 further comprising:
a scheduler configured to monitor the database at predetermined periodic intervals of time and identify one or more projects that are modeled and are ready for code generation; and
a project processor configured to process the identified one or more projects and identify corresponding application model XMLs stored in a repository.

11. The system of claim 7 further comprising an integrated application store configured to store the generated application models and the developed software application codes to facilitate reuse.

12. A computer program product comprising:
a non-transitory computer-readable medium having computer-readable program code stored thereon, the computer-readable program code comprising instructions that, when executed by a processor, cause the processor to:
generate an application model of a software application, the application model comprises modeled components and technology stack information, the modeled components correspond to functional and design aspects of the software application, the application model being generated by dragging and dropping multiple components into corresponding modeling perspectives defined in a visual modeling environment, wherein the modeling perspectives provide:
one or more functional modules comprising information obtained based on requirement analysis of the software application, and one or more use cases that are capable of being linked to each other based on predefined logical flow of the one or more functional modules for modeling functional flow of the software application, and
further wherein the modeling perspectives provide one or more components that are capable of being linked based on a predefined transactional flow to define transactions for each of the one or more use cases for modeling transactional flow of the software application;
generate descriptors for the application model, the descriptors being logical representations describing each of the modeled components, wherein the descriptors are generated based on elements, attributes, and mappings defined in application model object of the application model;
identify one or more technology templates based on the technology stack information in the application model, wherein the technology templates are predetermined templates including one or more scripting languages for automatically transforming the application model into one or more technologies;
generate blocks of code related to the software application based on the descriptors and the identified one or more technology templates, wherein the blocks of code correspond to the technology defined in the technology stack information; and
assembling, via the processor, the blocks of code to generate the software application based on logical formatting of the blocks of code.

13. The computer program product of claim 12, wherein the application model is generated as an application model XML file, wherein the application model XML file comprises project XML file, CommonModule XML file, ModuleN XML file, Settings XML file, layouts XML file and stack XML file related to the software application.

14. The computer program product of claim 12, wherein the multiple components comprise one or more functional modules, use case, system transaction components, working screen components, and database components.

15. The computer program product of claim 12, wherein the technology templates comprise Java, Net and mobile technology templates.

16. The computer program product of claim 12, wherein code related to the software application is generated using a code generator routine based on the descriptors and the identified one or more technology templates.

17. The computer-implemented method of claim 1, wherein the modeling perspectives further provide one or more tool adaptors which facilitate modeling an integration process of the software application with one external component or at least one commercial off-the-shelf product.

18. The computer-implemented method of claim 1, wherein each of the modeling perspectives facilitate adding one or more new components and modeling features to cater to new requirements of the software application.

* * * * *